Sept. 1, 1925.

S. G. WINGQUIST

HYDRAULIC COUPLING AND CHANGE SPEED GEAR

Filed Sept. 16, 1922 4 Sheets-Sheet 1

INVENTOR:
Sven Gustaf Wingquist
By Attorneys,

Sept. 1, 1925.

S. G. WINGQUIST 1,552,023

HYDRAULIC COUPLING AND CHANGE SPEED GEAR

Filed Sept. 16, 1922    4 Sheets-Sheet 2

INVENTOR:
Sven Gustaf Wingquist
By Attorneys,

Sept. 1, 1925.  
S. G. WINGQUIST  
HYDRAULIC COUPLING AND CHANGE SPEED GEAR  
Filed Sept. 16, 1922  4 Sheets-Sheet 3

INVENTOR:  
Sven Gustaf Wingquist  
By Attorneys,

Patented Sept. 1, 1925.

1,552,023

UNITED STATES PATENT OFFICE.

SVEN GUSTAF WINGQUIST, OF GOTTENBORG, SWEDEN.

HYDRAULIC COUPLING AND CHANGE-SPEED GEAR.

Application filed September 16, 1922. Serial No. 588,655.

*To all whom it may concern:*

Be it known that I, SVEN GUSTAF WINGQUIST, a subject of the King of Sweden, residing at Gottenborg, in the Kingdom of Sweden, have invented new and useful Improvements in Hydraulic Couplings and Change-Speed Gears, of which the following is a specification, reference being had to the drawings, accompanying and forming a part thereof.

This invention relates to hydraulic couplings and change speed gears which are provided with controlling means connected to a hydraulically actuated adjusting device in communication with the pressure chamber of the change speed gear so that the speed ratio will be directly dependent upon the pressure in the said chamber, i. e. on the load, and be varied, automatically, with the same.

The object of the invention is to provide a change speed gear of the kind, hereinbefore mentioned, suitable, particularly, for automobiles and similar multi-speed devices.

To this end the invention primarily consists in having a hydraulic adjusting device carried by one of the movable parts of the change speed gear, and so arranged that when the pressure in the pressure chamber, i. e. the turning moment of the driven part falls below a certain value it will provide a direct drive, and, when the turning moment exceeds the said value, it will provide a transmission ratio. The invention further comprises, an automatically operable valve device placed in the conduits leading to the pressure chamber, and which above a certain predetermined speed of rotation of the driving part, provides communication between the suction chamber of the change speed gear and the hydraulic adjusting device so as to bring the latter to occupy its position of rest and to obtain a direct drive independent of the temporary value of the turning moment. Further, the change speed gear may and preferably, is provided, with an automatically acting valve device which functions, below a certain speed of rotation of the driving part, to provide direct communication between the pressure chamber and the suction chamber of the change speed gear, so as to obtain free engine. The coupling and change speed gear according to this invention may be and preferably is carried out according to the differential principle, in which, as is known, that part only of the load, corresponding to the difference of speed between the driving part and the driven one is transmitted through pumping action, while the remaining and, generally, greater part of the load is transmitted directly through the fluid pressure between the said parts, without pumping action.

In the drawings, annexed hereto, I have shown one embodiment of a hydraulic coupling and change speed gear arranged according to the differential principle, which consists of two vane pump devices and in which the speed ratios are performed by regulating the capacity of one of the said pump devices.

In the form of embodiment of the change speed gear shown in the drawings and which consists of two sliding vane pump devices, hereinafter referred to as pump devices X and Y, 1 designates a driving shaft, rigidly secured to an outer casing 2 forming the driving rotor of the gear, said casing being provided with abutments 3, 4 and 5, 6, for the sliding vane pump devices Y and X respectively. Rotatably mounted in the casing 2 is a driven shaft 7, to which is keyed a rotor 9 having radially movable vanes 8 and forming together with the driving rotor 2 the pump device X, acting as a delivery pump. The radial movements of the vanes 8, are such that when passing the abutments 5, 6, they are moved inwardly, so as to pass freely by the abutments, and then, gradually, moved outwardly into contact with the working surfaces, by means of rollers 10 (Fig. 1) placed at the inner ends of the vanes and guided in a curved slot 11 formed in a part 12 movable with relation to the vanes and rigidly secured to the partition 13 in the casing 2, which forms the dividing wall between the two pump devices X and Y. The curved slot 11 in the present construction is located at or in the proximity of the radial plane passing through the centres of gravity of the vanes for the dual purpose of saving space and obtaining an effective guide for the vanes. Within the chamber of the pump device Y in the casing 2 is positioned a stator 14 which is clamped to a sleeve 15 rotatable with relation to the driven shaft 7, and to the outer end of said sleeve 15 is secured a brake wheel 16, provided with a brake band 17, by means of which rotation of the sleeve 15 and the stator 14 may be checked. The stator 14 is provided with radially movable working vanes 18 (Figs. 1 and 2), and with radially adjustable auxiliary abutment vanes 19 adapted to bear tightly against the radially adjustable abutments 3 and 4. The vanes 18 are guided, as are the vanes 8, by means of rollers 20 in a curved slot 21 formed in a part 22 rigidly secured to the partition 13. The auxiliary abutment vanes 19 are adjusted by means of slides 23 movable in the stator body 14 and provided with slots 24 inclined to the direction of movement and engaging guide ribs 25 provided at the inner ends of the auxiliary abutment vanes.

The form and arrangement of the rotors and braking means for the stator are not broadly claimed herein, but are claimed in my copending application Serial No. 418,264, filed October 20, 1920.

The adjustability of pump capacity through radial adjustment of the coacting abutments and auxiliary abutment vanes is also not broadly claimed herein, but is claimed in my copending application Serial No. 521,016, filed December 8, 1921.

The abutments 3, 4, which are, in the form of embodiment shown, acted on by springs 26 placed in the casing 2, are carried by and preferably made integral with slides 27 (one only shown in Figs. 1 and 3) which are adjustable in a radial direction and provided at their inner ends with a dove-tail formed rib 28, which engages a correspondingly formed slot in an axially movable sleeve 29. The slot in the sleeve 29 has, as is herein shown, the same inclination to the direction of movement (the direction of the shaft) as have the slots 24 in the slides 23, so that, when moving the sleeve 29 and the slides 23 simultaneously in the same direction and with the same speed, the movements of the abutments 3, 4 and the auxiliary abutment vanes 19 will be uniform while maintaining the close contact between the said members. The driving rotor 2 with the adjustable abutments 3, 4 and the stator 14 with the movable vanes 18 and the auxiliary abutment vanes 19 constitute the pump device Y, which is adjustable as to its capacity, and acts as a receiving pump. In this case, the capacity is defined, in known manner, by the radial distance between the working surfaces 30 and the abutments 3, 4, so that the greater the said distance is made (by moving the abutments inwardly) the greater will the capacity be, while, if the said distance be decreased to zero, as shown in Fig. 2, also the capacity of the pump device Y will be zero. The auxiliary abutment vanes are provided at their outer ends with plates 31, relatively broad in a peripheral direction, and are so many in number (twelve in the form of embodiment shown) that one auxiliary abutment vane bears always against one and the same abutment.

The regulating of the capacity of the pump device Y is automatically controlled, according to the present invention, by a device, more particularly described as follows:

Movable in the driven shaft 7, which is, in the present case, made hollow, is a piston 32 the rod 33 of which is provided with a projecting cross-pin 34 movable in slots 35 in the shaft 7 and connected to a sleeve 36 movable on the said shaft. Rotatably mounted, but not axially movable on the said sleeve 36 is the sleeve 29 carrying the slides 27 with the abutments 3, 4, and the slides 23 engaging the auxiliary abutment vanes 19, so that in moving the piston 32, the sleeve 29 and the slides 23 will also be moved by means of the pin 34, and the sleeve 36 and, thereby, perform the regulating of the abutments and the auxiliary abutment vanes. Into the piston chamber 37 opens a conduit 38 made in the side wall of the casing 2 and which can by means of conduits 39 (only one shown in Figs. 1 and 4) and valve devices 40, 41 be put into communication with the pressure chambers 75, 76 or the suction chamber of the gear. To this end, the valves are provided with two systems of openings 42 and 43, respectively, Figs. 6 and 7, the first mentioned of which establishes through the conduits 38 and 39 communication between the piston chamber 37 and the suction chamber 75 of the pump device X, Figs. 4 and 7, while the latter establishes through the conduits 38 and 39 and a conduit 44 communication between the piston chamber 37 and the pressure chambers of the pump device X, Figs. 1, 5 and 6. The valve bodies 40, 41 are provided with arms 45 and 46, respectively, which by means of springs 47 and 48 normally maintain the valves in the position shown in Figs. 1, 5 and 6, when the driving rotor 2 is at rest or revolving below a predetermined speed and above a certain speed of rotation of the casing 2 the arms are moved outwardly, due to the centrifugal force, and move the valves to the position shown in Figs. 4 and 7.

Figure 1:
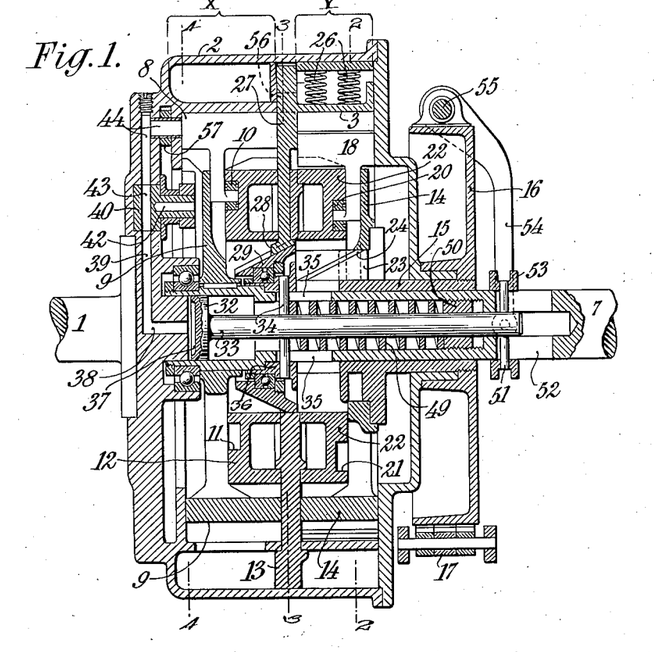
Fig. 1 is a radial section along the line 1—1 of Fig. 2.
Figure 2:
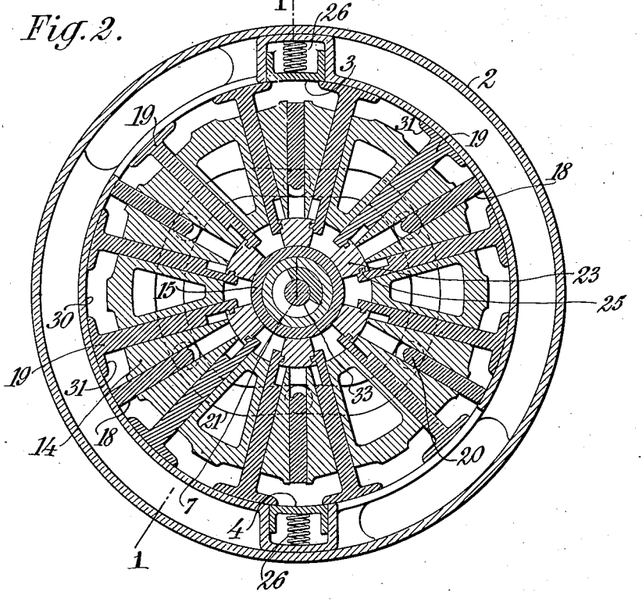
Fig. 2 is a cross-section along the line 2—2 of Fig. 1.

The movement of the controlling piston 32 for effecting increased capacity of the pump device Y (in the direction from the left to the right in Fig. 1) is counteracted by a spring 49 pressed between the pin 34 and a nut 50 screwed in the shaft 7 and which tends to move the piston to the position of rest shown in Fig. 1. Connected to the piston rod 33 is, further, a pin 51 movable in an aperture 52 in the shaft 7 and secured to a coupling sleeve 53 movable on the said shaft. Pivotally connected with the said sleeve 53 is a forked arm 54 which is firmly secured to a tightening screw 55 for the brake band 17, so that in moving the piston 32 against the action of the spring 49 the wheel 16 and, therewith, the sleeve 15 and the stator 14 are automatically checked.

Figure 3:
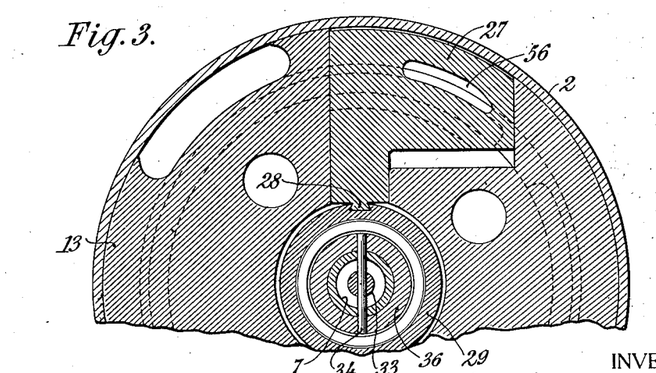
Fig. 3 is a cross-section along the line 3—3 of Fig. 1.

In the slides 27, carrying the abutments 3, 4 and which in direct drive shut off the communication between the pressure chambers 73, 74 of the pump devices X and Y in order to prevent leakage, there is provided an opening 56, Figs. 1 and 3, through which, in moving the slides 27 in the direction towards the centre of rotation, a direct communication is established between the said chambers.

Figure 4:
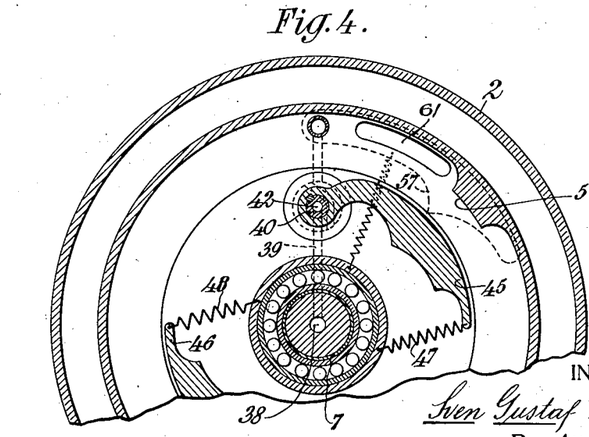
Figs. 4 and 5 are cross-sections along the line 4—4 of Fig. 1, showing the automatic valve device in two different positions.

In addition, there are provided valves 57 and 58, Figs. 4 and 5, operable by centrifugal force and which provide, below a certain number of revolutions of the rotor 2, a direct communication between the pressure chamber 73 of the pump device X and the suction chambers 75, 76 common to the two pump devices, through the openings 61 and 62 and conduits 71 and 72 but which in exceeding the said number of revolutions shut off such communication.

In the following description of the mode of operation of the device it will be assmed that the valves 57 and 58 will be operative at about 300 revolutions per minute and the valves 40, 41 at about 900 revolutions per minute.

Figures 5, 6, 8:
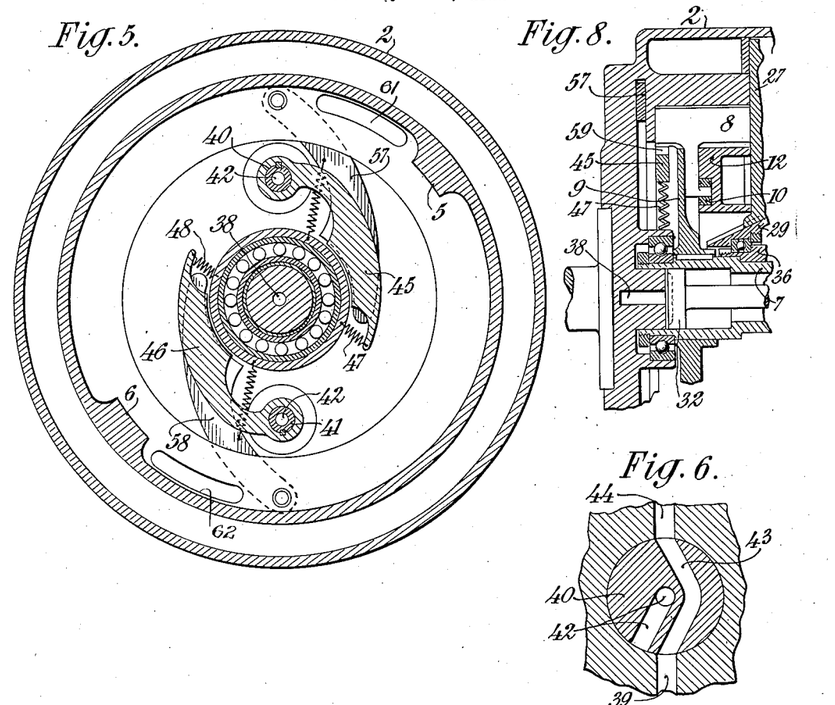
Figs. 6 and 7 show, schematically and on a larger scale, the position of the valve according to Figs. 5 and 4 respectively.
Figs. 8 and 9 show a modification of the valve devices.

It is, further, assumed that, when the device is at rest, all parts take up the positions, shown in Figs. 1, 2, 3 and 5, in which, due to the position of the valves 57, 58, with respect to openings 61 and 62 respectively direct communication is established between the pressure chamber 73 and the suction chamber 75 of the pump device X, and the capacity of the pump device Y is zero since communication between the pressure chambers 73 and 74 respectively of the pump devices X and Y is shut off, through the closure of passage 56 and further communication is established between the piston chamber 37 and the pressure chamber 73 of the pump device X through passages 38, 39, 43 and 44 (the valve position according to Fig. 6).

Figure 10:
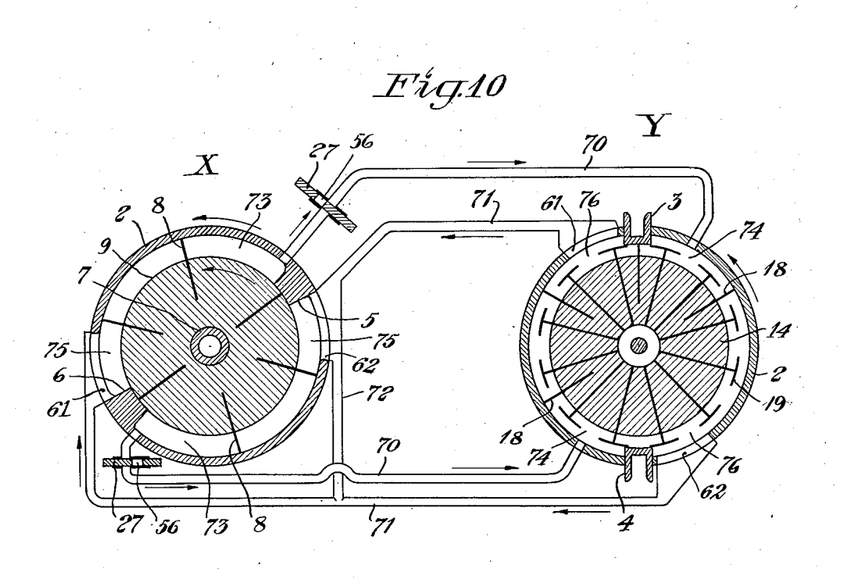
Fig. 10 shows schematically the fluid passages of the pump device, which, although shown displaced, are in fact axially arranged.

If now the casing 2 be gradually put in rotation in the direction of the arrows in Fig. 10, this has, obviously, no influence on the driven shaft 7, because, as mentioned, a direct communication exists between the pressure chamber and suction chamber of the pump device X. Thus, there is performed only a circulation of the pressure fluid within the said pump device X. The capacity of the pump device Y as mentioned, is zero, and, besides, the stator 14 is in this position released, so as to rotate freely with the casing 2. Thus, there exists within the last mentioned pump device no pumping action at all. In other words, the shaft 1 with the casing 2 can rotate freely, independent of the shaft 7, which is, in this case, at rest (free engine).

When the casing 2 begins to exceed the assumed number of 300 revolutions per minute, the valves 57 and 58 will gradually shut off the communication between the pressure chamber and suction chamber of the pump device X whereupon there arises in the pressure chamber a gradually increased pressure, which is, through the conduits 44, 43, 39 and 38, transmitted to the piston chamber 37. The piston 32 will, thereby, be moved against the action of the spring 49 in the direction from the left to the right in Fig. 1, the abutments 3, 4 and the auxiliary abutment vanes 19 being, thereby, moved inwardly, so as to increase, correspondingly, the capacity of the pump device Y. Simultaneously, there is established through the openings 56 in the slides 27 a communication between the pressure chambers 73 and 74 respectively by way of conduits 70 of the pump devices X and Y, and the stator 14 will be checked, in the manner described. Accordingly there arises a pumping action between the two pump devices X and Y and the rotor 9 with the shaft 7 is put in rotation with a speed, which is, directly, dependent on the ratio between the volumetric capacities of the pump devices, that part only of the load, which corresponds to the difference of speed between the shafts 1 and 7, being thereby, transmitted through pumping action, while the other part of the load is transmitted, directly, through the fluid pressure between the rotors 2 and 9.

If, in this case, the load on the shaft 7 be great, the pressure in the piston chamber 37, and, consequently, also the degree of movement of the piston 32 will increase correspondingly, whereby also the capacity of the pump device Y and, therewith, the transmission ratio between the shafts 7 and 1 will increase. If, on the other hand, the load on the shaft 7 be decreased, the pressure in the piston chamber 37 and, consequently, the capacity of the pump device Y will decrease. In this case, also the transmission ratio between the shafts decreases. In other words, the transmission ratio is directly dependent on the load on the shaft 7 and increases or decreases, automatically, with the same. If, further, the load on the shaft 7 be so small that the pressure on the piston 32 be less than the compression of the spring 49, obviously the piston 32 will be moved back to the position of rest, and a direct drive will be obtained.

If it be, further, assumed that the shaft 1 with the casing 2 begins to exceed the assumed number of revolutions of 900 per minute, also the valves 40 and 41 will be active (Figs. 4 and 7) and open communication between the piston chamber 37 and the suction chambers 75 and 76 of the gear (through the conduits 38, 39, 42, 71 and 72), the piston 32 being, thereby, through the influence of the spring 49 moved back to and retained in the position of rest (Fig. 1), the abutments 3, 4 and the auxiliary abutment vanes 19 being moved back to the positions, shown in Figs. 1 and 2, in which the capacity of the pump device Y is zero. Simultaneously, also the communication between the pressure chambers of the pump devices, through the opening 56, is shut off, and the stator 14 is released. Thus, the pressure fluid will be, entirely, locked in the pump device X, without any possibility of circulating within the said pump device, which, obviously, results in that the shaft 7 will be driven with the same speed as the shaft 1 (direct drive). Obviously, the load is thus transmitted, directly through the fluid in the pump device X.

Figures 7, 9:
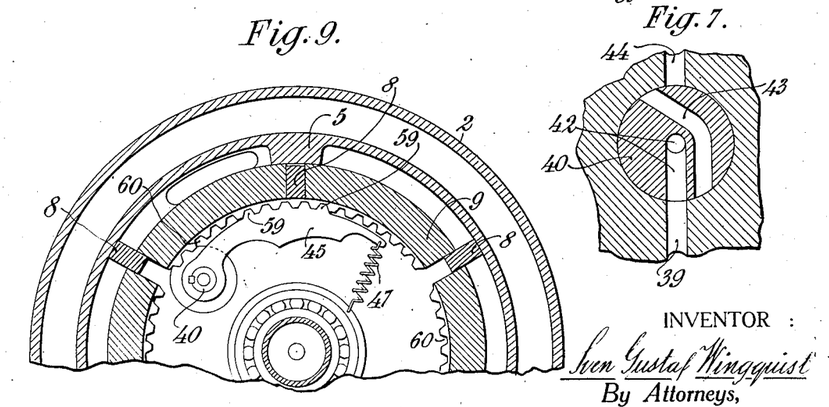

If it be desired to avoid this action, which results in losses due to leakage, the valve arms 45 and 46 may be provided, as shown in Figs. 8 and 9, with teeth 59 or the like, which are, at the speed of rotation mentioned, caused to mesh with corresponding teeth 60 in the rotor 9, thereby establishing a true mechanical coupling together of the shafts 1 and 7. On account of the small difference of speed between the shafts the said coupling is performed smoothly.

While I have shown and described certain preferred embodiments of my invention, it will be understood that various changes may be made therein without departing from the spirit of the invention.

I claim:

1. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, a hydraulic adjusting device connected to said controlling means and carried by one of the movable parts of the change speed gear, and an arrangeemnt of conduits connecting said hydraulic adjusting device with the pressure chamber of one of the pumps of the change speed gear.

2. A hydraulic coupling and change speed gear, comprising a driving rotor, a driven rotor having a shaft connected thereto and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, and a movable piston provided in said driven shaft of the change speed gear and connected to said controlling means, said piston being acted on in the one direction by the fluid pressure and in the other direction by an adjustable spring.

3. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, a hydraulic adjusting device connected to said controlling means and carried by one of the movable parts of the change speed gear, an arrangement of conduits connecting said hydraulic adjusting device with the pressure chamber of said delivery pump, and valves provided in said conduits and acted on by centrifugal force and providing automatically on exceeding a certain predetermined speed of rotation of one of the rotary parts of the change speed gear a communication between one of the suction chambers of the change speed gear and said hydraulic adjusting device, so as to cause a direct drive independent of the temporary value of the turning moment, i. e. of the load to be driven.

4. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, a hydraulic adjusting device connected to said controlling means and carried by one of the movable parts of the change speed gear, an arrangement of conduits connecting said hydraulic adjusting device with the pressure chamber of said delivery pump, and valves provided in said conduits and acted on by centrifugal force and providing automatically on exceeding a certain predetermined speed of rotation of one of the rotary parts of the change speed gear a communication between one of the suction chambers of the change speed gear and said hydraulic adjusting device, so as to cause a direct drive independent of the temporary value of the turning moment, i. e. of the load to be driven, said valves having arms acted on by springs, which cause the valves to occupy the position, in which a communication exists between the hydraulic adjusting device and the pressure chamber of the delivery pump, and which by centrifugal force move the valves to the position, in which a communication exists between said hydraulic adjusting device and one of the suction chambers of the gear.

5. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, a hydraulic adjusting device connected to said controlling means and carried by one of the movable parts of the change speed gear, an arrangement of conduits connecting said hydraulic adjusting device with the pressure chamber of said delivery pump, and means for effecting automatically a mechanical connection between the driving rotor and the driven rotor on exceeding a certain speed of rotation.

6. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, a hydraulic adjusting device connected to said controlling means and carried by one of the movable parts of the change speed gear, an arrangement of conduits connecting said hydraulic adjusting device with the pressure chamber of said delivery pump, and a valve device located between the pressure chambers of the delivery pump device and of the receiving pump device and connected to said hydraulic adjusting device and shutting off on direct drive the communication between the said pressure chambers.

7. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, a hydraulic adjusting device connected to said controlling means and carried by one of the movable parts of the change speed gear, and an arrangement of conduits connecting said hydraulic adjusting device with the pressure chamber of said delivery pump, said controlling means comprising radially adjustable abutments and radially adjustable auxiliary abutment vanes connected to said hydraulic adjusting device and adapted for varying the volumetric capacity of one of said pumps.

8. A hydraulic coupling and change speed gear, comprising a driving rotor, a driven rotor having a shaft connected thereto and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, and a movable piston provided in said driven shaft of the change speed gear and connected to said controlling means, said piston being acted on in the one direction by the fluid pressure and in the other direction by an adjustable spring, said controlling means comprising radially adjustable abutments and radially adjustable auxiliary abutment vanes connected to said piston and adapted for varying the volumetric capacity of one of said pumps.

9. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, a hydraulic adjusting device connected to said controlling means and carried by one of the movable parts of the change speed gear, an arrangement of conduits connecting said hydraulic adjusting device with the pressure chamber of said delivery pump, and valves provided in said conduits and acted on by centrifugal force and providing automatically on exceeding a certain predetermined speed of rotation of one of the rotary parts of the change speed gear a communication between one of the suction chambers of the change speed gear and said hydraulic adjusting device, so as to cause a direct drive independent of the temporary value of the turning moment, i. e. of the load to be driven, said controlling means comprising radially adjustable abutments and radially adjustable auxiliary abutment vanes connected to said hydraulic adjusting device and adapted for varying the volumetric capacity of one of said pumps.

10. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, a hydraulic adjusting device connected to said controlling means and carried by one of the movable parts of the change speed gear, an arrangement of conduits connecting said hydraulic adjusting device with the pressure chamber of said delivery pump, and valves provided in said conduits and acted on by centrifugal force and providing automatically on exceeding a certain predetermined speed of rotation of one of the rotary parts of the change speed gear a communication between one of the suction chambers of the change speed gear and said hydraulic adjusting device, so as to cause a direct drive independent of the temporary value of the turning moment, i. e. of the load to be driven, said valves having arms acted on by springs, which cause the valves to occupy the position, in which a communication exists between the hydraulic adjusting device and the pressure chamber of the delivery pump, and which by centrifugal force move the valves to the position, in which a communication exists between said hydraulic adjusting device and one of the suction chambers of the gear, said controlling means comprising radially adjustable abutments and radially adjustable auxiliary abutment vanes connected to said hydraulic adjusting device and adapted for varying the volumetric capacity of one of said pumps.

11. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, a hydraulic adjusting device connected to said controlling means and carried by one of the movable parts of the change speed gear, an arrangement of conduits connecting said hydraulic adjusting device with the pressure chamber of said delivery pump, and means for effecting automatically a mechanical connection between the driving rotor and the driven rotor on exceeding a certain speed of rotation, said controlling means comprising radially adjustable abutments and radially adjustable auxiliary abutment vanes connected to said hydraulic adjusting device and adapted for varying the volumetric capacity of one of said pumps.

12. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, a hydraulic adjusting device connected to said controlling means and carried by one of the movable parts of the change speed gear, an arrangement of conduits connecting said hydraulic adjusting device with the pressure chamber of said delivery pump, and a valve device located between the pressure chambers of the delivery pump device and of the receiving pump device and connected to said hydraulic adjusting device and shutting off on direct drive the communication between the said pressure chambers, said controlling means comprising radially adjustable abutments and radially adjustable auxiliary abutment vanes connected to said hydraulic adjusting device and adapted for varying the volumetric capacity of one of said pumps.

13. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, a hydraulic adjusting device connected to said controlling means and carried by one of the movable parts of the change speed gear, and an arrangement of conduits connecting said hydraulic adjusting device with the pressure chamber of said delivery pump, said stator being connected to an adjustable brake device, which is in turn connected to the said hydraulic adjusting device in such manner that the stator will be checked in all positions of the hydraulic adjusting device except in its position of rest.

14. A hydraulic coupling and change speed gear, comprising a driving rotor, a driven rotor having a shaft connected thereto and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, and a movable piston provided in said driven shaft of the change speed gear and connected to said controlling means, said piston being acted on in the one direction by the fluid pressure and in the other direction by an adjustable spring, said stator being connected to an adjustable brake device, which is in turn connected to the said piston in such manner that the stator will be checked in all positions of the piston except in its position of rest.

15. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, a hydraulic adjusting device connected to said controlling means and carried by one of the movable parts of the change speed gear, an arrangement of conduits connecting said hydraulic adjusting device with the pressure chamber of said delivery pump, and valves provided in said conduits and acted on by centrifugal force and providing automatically on exceeding a certain predetermined speed of rotation of one of the rotary parts of the change speed gear a communication between one of the suction chambers of the change speed gear and said hydraulic adjusting device, so as to cause a direct drive independent of the temporary value of the turning moment, i. e. of the load to be driven, said stator being connected to an adjustable brake device, which is in turn connected to the said hydraulic adjusting device in such manner that the stator will be checked in all positions of the hydraulic adjusting device except in its position of rest.

16. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said siding vane pump devices, controlling means for at least one of said pumps, a hydraulic adjusting device connected to said controlling means and carried by one of the movable parts of the change speed gear, an arrangement of conduits connecting said hydraulic adjusting device with the pressure chamber of said delivery pump, and valves provided in said conduits and acted on by centrifugal force and providing automatically on exceeding a certain predetermined speed of rotation of one of the rotary parts of the change speed gear a communication between one of the suction chambers of the change speed gear and said hydraulic adjusting device, so as to cause a direct drive independent of the temporary value of the turning moment, i. e. of the load to be driven, said valves having arms acted on by springs, which cause the valves to occupy the position, in which a communication exists between the hydraulic adjusting device and the pressure chamber of the delivery pump, and which by centrifugal force move the valves to the position, in which a communication exists between said hydraulic adjusting device and one of the suction chambers of the gear, said stator being connected to an adjustable brake device, which is in turn connected to the said hydraulic adjusting device in such manner that the stator will be checked in all positions of the hydraulic adjusting device except in its position of rest.

17. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, a hydraulic adjusting device connected to said controlling means and carried by one of the movable parts of the change speed gear, an arrangement of conduits connecting said hydraulic adjusting device with the pressure chamber of said delivery pump, and means for effecting automatically a mechanical connection between the driving rotor and the driven rotor on exceeding a certain speed of rotation, said stator being connected to an adjustable brake device, which is in turn connected to the said hydraulic adjusting device in such manner that the stator will be checked in all positions of the hydraulic adjusting device except in its position of rest.

18. A hydraulic coupling and change speed gear, comprising a driving rotor, a driven rotor and a stator, said driving rotor and said driven rotor forming a sliding vane pump device acting as a delivery pump, and one of said rotors and said stator forming a second sliding vane pump device acting as a receiving pump, one of said rotors being common to both of said sliding vane pump devices, controlling means for at least one of said pumps, a hydraulic adjusting device connected to said controlling means and carried by one of the movable parts of the change speed gear, an arrangement of conduits connecting said hydraulic adjusting device with the pressure chamber of said delivery pump, and a valve device located between the pressure chambers of the delivery pump device and of the receiving pump device and connected to said hydraulic adjusting device and shutting off on direct drive the communication between the said pressure chambers, said stator being connected to an adjustable brake device, which is in turn connected to the said hydraulic adjusting device in such manner that the stator will be checked in all positions of the hydraulic adjusting device except in its position of rest.

In testimony whereof I have signed my name.

SVEN GUSTAF WINGQUIST.